(12) United States Patent
Black

(10) Patent No.: US 11,803,991 B1
(45) Date of Patent: *Oct. 31, 2023

(54) VISUALIZATION TOOL FOR SERVER MANAGEMENT AND METHOD OF USE

(71) Applicant: UIPCO, LLC, San Antonio, TX (US)

(72) Inventor: Stanley Joseph Black, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,934

(22) Filed: Mar. 29, 2022

Related U.S. Application Data

(63) Continuation of application No. 17/005,993, filed on Aug. 28, 2020, now Pat. No. 11,328,462, which is a
(Continued)

(51) Int. Cl.
| | |
|---|---|
| *G06T 11/20* | (2006.01) |
| *H04L 43/065* | (2022.01) |
| *G06T 11/60* | (2006.01) |
| *G06T 11/00* | (2006.01) |
| *H04L 43/045* | (2022.01) |
| *H04L 43/0817* | (2022.01) |
| *H04L 41/22* | (2022.01) |

(52) U.S. Cl.
CPC ......... *G06T 11/206* (2013.01); *G06T 11/001* (2013.01); *G06T 11/60* (2013.01); *H04L 41/22* (2013.01); *H04L 43/045* (2013.01); *H04L 43/065* (2013.01); *H04L 43/0817* (2013.01)

(58) Field of Classification Search
CPC .............................. G06T 11/206; G06T 11/001
See application file for complete search history.

(56) References Cited

U.S. PATENT DOCUMENTS

| | | | |
|---|---|---|---|
| 8,234,641 B2* | 7/2012 | Fitzgerald | G06F 21/51 |
| | | | 718/1 |
| 8,458,695 B2* | 6/2013 | Fitzgerald | G06F 9/455 |
| | | | 718/1 |

(Continued)

OTHER PUBLICATIONS

Perry, J., Ousterhout, A., Balakrishnan, H., Shah, D., & Fugal, H. (Aug. 2014). Fastpass: A centralized "zero-queue" datacenter network. In Proceedings of the 2014 ACM conference on SIGCOMM (pp. 307-318).*

(Continued)

*Primary Examiner* — Sarah Lhymn
(74) *Attorney, Agent, or Firm* — Plumsea Law Group, LLC

(57) ABSTRACT

A data visualization tool and a method of using the tool for managing resources in a set of server clusters is disclosed. The visualization tool displays the allotment of computational resources among various categories, including currently allocated resources, resources reserved for pending requests and available resources. The resources include CPUs, memory, and storage. The visualization tool is configured to visually indicate the difference between server clusters where new resources can be allocated and other clusters where one or more resources are capped and prevent any new allocations. The visualization tool is also configured to show current utilization of each resource for comparison with the amount allocated.

20 Claims, 10 Drawing Sheets

Related U.S. Application Data continuation of application No. 16/205,624, filed on Nov. 30, 2018, now abandoned.

(56) References Cited

U.S. PATENT DOCUMENTS

| | | | |
|---|---|---|---|
| 8,606,920 B1 | 12/2013 | Gupta | |
| 8,738,333 B1 | 5/2014 | Behera | |
| 8,949,826 B2 * | 2/2015 | Fitzgerald | G06F 9/45533 718/1 |
| 9,418,455 B1 * | 8/2016 | Wong | G06F 11/3006 |
| 9,472,002 B1 * | 10/2016 | Wong | G06F 11/328 |
| 9,509,617 B1 * | 11/2016 | Malmgren | H04L 43/0882 |
| 10,129,105 B2 * | 11/2018 | Cropper | H04L 41/0897 |
| 2008/0059610 A1 | 3/2008 | Lin | |
| 2011/0029880 A1 | 2/2011 | Neuse et al. | |
| 2013/0019197 A1 | 1/2013 | Brugler et al. | |
| 2013/0031559 A1 * | 1/2013 | Alicherry | G06F 9/5077 718/104 |
| 2013/0262685 A1 | 10/2013 | Shelton | |
| 2014/0039683 A1 | 2/2014 | Zimmermann | |
| 2014/0122666 A1 | 5/2014 | Malhotra et al. | |
| 2014/0137131 A1 | 5/2014 | Dheap et al. | |
| 2014/0298047 A1 | 10/2014 | Holler | |
| 2017/0048223 A1 * | 2/2017 | Anantha Padmanaban | H04L 63/0807 |
| 2017/0124167 A1 | 5/2017 | Pasupathy et al. | |
| 2017/0124191 A1 | 5/2017 | Sareen et al. | |
| 2017/0207977 A1 * | 7/2017 | Soni | G06F 9/45558 |
| 2017/0272379 A1 | 9/2017 | McClean et al. | |
| 2017/0336768 A1 | 11/2017 | Geffin | |
| 2018/0063026 A1 * | 3/2018 | Beveridge | G06Q 10/06395 |
| 2019/0081879 A1 | 3/2019 | Wu | |
| 2019/0258557 A1 | 8/2019 | Mazzitelli et al. | |

OTHER PUBLICATIONS

Infrastructure, V. (2006), Resource arrangement with VMware DRS. VMware Whitepaper, 13 (pp. 1-24).

Waikenbach, John. Microsoft Excel 2010 Bibie (VVitl1 CD) Johny Wley & Sons, 2010 (pp. 1-1058).

Autoscaling (available at: https://docs.microsoft.com/en-us/azure/architecture/best-practices/auto-scaling) (2017).

Non-Final Office Action dated Sep. 20, 2021 for U.S. Appl. No. 17/005,993.

Mazumdar, S., & Pranzo, M. (2017). Power efficient server consolidation for cloud data center. Future Generation Computer Systems, 70, 4-16.

Notice of Allowance dated Jan. 24, 2022 for U.S. Appl. No. 17/005,993.

* cited by examiner

| FARM | | AVAILABLE | | | STRANDED | | | |
|---|---|---|---|---|---|---|---|---|
| | CLUSTERS | VCPU | MEMORY | STORAGE | VCPU | MEMORY | STORAGE | |
| ZONE 1 | 6 | 0 | 0 GB | 0.00 TB | 193 | 22656 GB | 458.14 TB |
| ZONE 2 | 6 | 404 | 7586 GB | 20.94 TB | 390 | 21256 GB | 445.67 TB |
| ZONE 3 | 5 | 1736 | 33795 GB | 98.24 TB | 0 | 0 GB | 0 TB |
| ZONE 4 | 5 | 1080 | 24094 GB | 95.93 TB | 775 | 11889 GB | 0 TB |
| TOTAL FARM | 22 | 3220 | 65475 GB | 215.11 TB | 1358 | 55801 GB | 903.81 TB |

AVAILABLE = THERE ARE NO IMPEDIMENTS TO USING THAT RESOURCE

STRANDED = RESOURCE NOT USABLE BECAUSE OF CAPPED PARTNER RESOURCES

FIG. 11

VISUALIZATION TOOL FOR SERVER MANAGEMENT AND METHOD OF USE

CROSS-REFERENCE TO RELATED APPLICATIONS

This application is a Continuation of Black, U.S. Pat. No. 11,328,462, issued on May 10, 2022, and titled "Visualization Tool for Server Management and Method of Use," which is a Continuation of and claims benefit to U.S. application Ser. No. 16/205,624, filed on Nov. 30, 2018, titled "Visualization Tool for Server Management and Method of Use." All of the disclosures above are hereby incorporated by reference in their entirety.

TECHNICAL FIELD

The present disclosure generally relates to visualization tools and methods, and specifically to tools and methods for visualizing server data.

BACKGROUND

A private computing cloud is made up of many virtual servers operating within clusters. It a dynamic environment with high demand for compute power. Because many individuals are working to provision computing resources it is easy to accidentally promise the same computing resources to competing projects. In an environment of financial constraints where demand outstrips available capacity this can lead to significant angst on the part of customers. Additionally, it is difficult to keep in mind how much space is needed for upcoming projects and know if someone else has promised capacity to a different project when looking at what space appears to be available right now.

There is a need in the art for a system and method that addresses the shortcomings discussed above.

SUMMARY

In one aspect, a method implemented on an electronic computing device of creating a graphical representation of data for visualizing server cluster capacity in a server cluster includes displaying a first data set and a second data set over a background, the first data set conveying information about a first computational resource of the server cluster and the second data set conveying information about a second computational resource of the server cluster. The first data set includes a first allocated percentage of the first computational resource that is presently allocated and a first available percentage of the first computational resource that is available. The second data set includes a second allocated percentage of the second computational resource that is presently allocated and a second available percentage of the second computational resource that is available. The method also includes steps of displaying a first utilization data point over the first data set to indicate the actual utilization of the first computational resource and displaying a second utilization data point over the second data set to indicate the actual utilization of the second computational resource. The background has a first color when the first available percentage and the second available percentage are both substantially greater than zero. The background has a second color when at least one of the first available percentage and the second available percentage are substantially equal to zero.

A method of managing resources in a set of server clusters using a data visualization of server cluster capacity includes steps of receiving a new resource request, using a data visualization tool to visualize server cluster capacity, including available capacity for CPUs, memory and storage within each server cluster in the set of server clusters, determining if at least one of the server clusters in the set of server clusters has available capacity to support the new resource request, and allocating resources corresponding to the new resource request to at least one server cluster when at least one server cluster has the available capacity to support the new resource request.

In another aspect, a system for managing resources in at least one server cluster includes a device processor and a non-transitory computer readable medium storing instructions. The instructions are executable by the device processor to display a first data set and a second data set over a background, the first data set conveying information about a first computational resource of the at least one server cluster and the second data set conveying information about a second computational resource of the at least one server cluster. The first data set includes a first allocated percentage of the first computational resource that is presently allocated and a first available percentage of the first computational resource that is available. The second data set includes a second allocated percentage of the second computational resource that is presently allocated and a second available percentage of the second computational resource that is available. The instructions are also executable to display a first utilization data point over the first data set to indicate the actual utilization of the first computational resource and display a second utilization data point over the second data set to indicate the actual utilization of the second computational resource. The background has a first color when the first available percentage and the second available percentage are both substantially greater than zero. The background has a second color when at least one of the first available percentage and the second available percentage are substantially equal to zero.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 11 is a schematic view of a report showing available and stranded resources across a plurality of server clusters, according to an embodiment.

DESCRIPTION OF EMBODIMENTS

The embodiments provide a data visualization tool and a method of using the data visualization tool. The tool combines existing allocation and utilization data with the forecast of upcoming projects by status. The tool puts planning and utilization in the same place to provide a more comprehensive picture for both technical teams and management. Using the visualization tool may drastically reduce the amount of time spent trying to construct a real-time picture of present and future allocations. This allows allocation decisions to be made immediately.

The data visualization tool provides a visualization of server cluster computational resources such as the number of CPU (or GPU) cores, memory, storage and the number of large virtual machines running on each server cluster. The data visualization shows, at a glance, the allotment of computational resources to various categories including: currently allocated resources, planned future allocated resources, reserved resources, and resources currently available for allocation. The data visualization also shows current utilization of each of the different computational resources in a cluster. In addition, the data visualization shows, at a glance, when each server cluster is unavailable because there is no more available capacity in one or more of the computational resources (that is, when one of the computational resources is capped).

By tracking and displaying the current, planned, reserved and available capacity in a single view, the visualization tool can be used to quickly assess the true capacity of server clusters as new requests for resources are received. By displaying the current utilization along with the allotment of resources, the visualization tool can be used to quickly assess server clusters that have underutilized capacity and therefore may be reconfigured to provide more available capacity.

The data visualization tool can also generate reports showing stranded resources. This may allow users of the system to quickly identify server clusters that can be reorganized to maximize capacity or to quickly make decisions to order new resources (for example, new server racks or clusters) to expand capacity.

Figure 1:
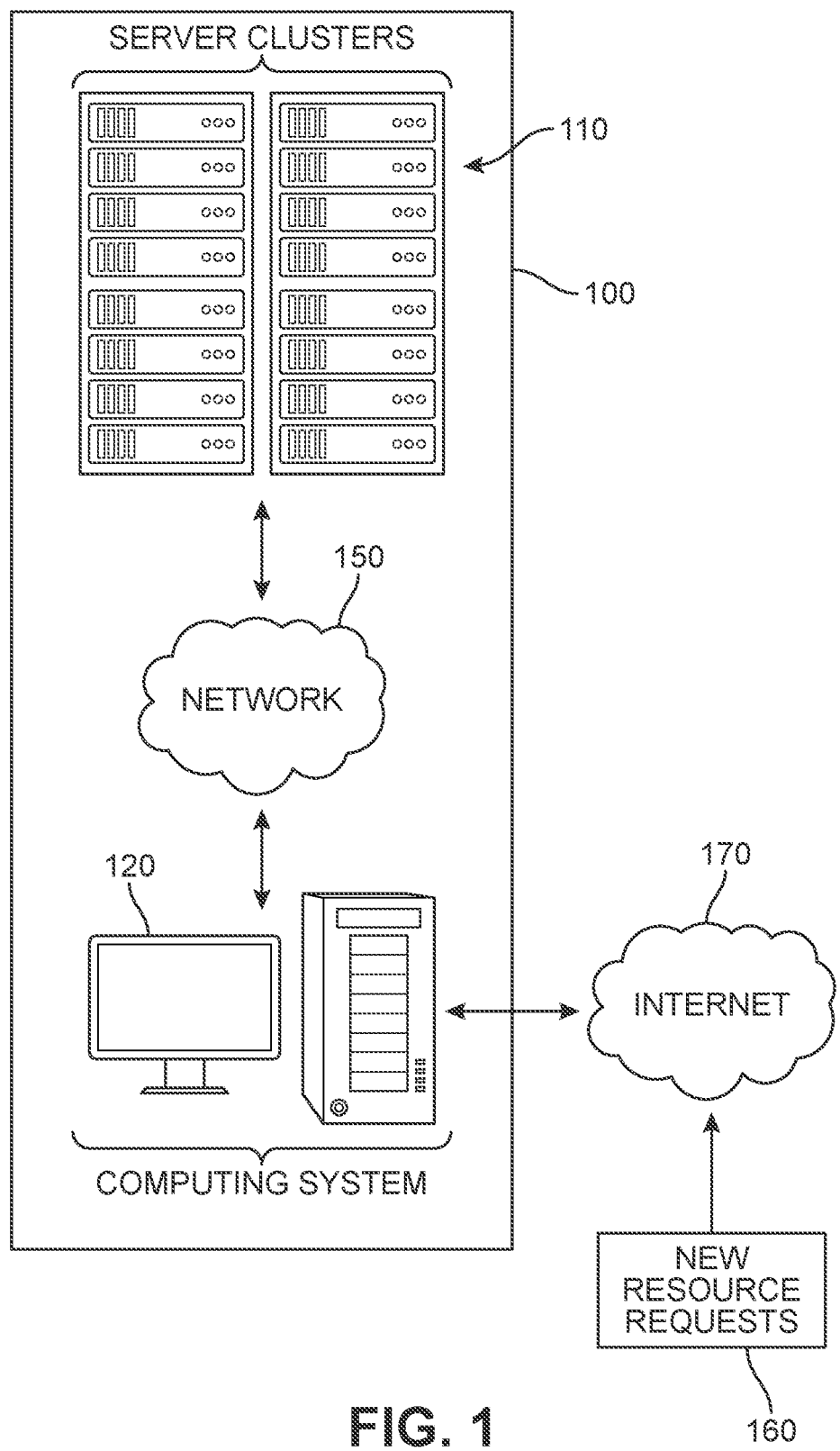
FIG. 1 is a schematic view of a server system including multiple server clusters and a computing system for managing the server clusters, according to an embodiment.

FIG. 1 is a schematic view of an embodiment of a server system 100. In some cases, the components of server system 100 may be disposed in a common location. In other cases, the components of server system 100 may be distributed across multiple different locations.

Referring to FIG. 1, server system 100 may include one or more server clusters 110. Server clusters 110 may comprise a plurality of servers that are deployed to serve a variety of different business enterprise processes (such as mail servers) and other custom processes used by the business, vendors associated with the business and/or other customers of the business. As an example, server clusters 110 may be utilized to create a private cloud within a company whose resources can be distributed to different parties to accommodate a variety of different internal projects.

Server clusters can be organized into multiple different zones or regions that are distributed through multiple different server centers and across different geographic locations. For example, a company operating a private cloud may have server centers in multiple cities, with each server center comprising multiple server clusters. In some embodiments, server clusters across multiple geographic regions can be organized into a virtual data center or a software-defined data center (SDDC).

Server center 100 also comprises systems for monitoring and managing server resources. Server center 100 includes a computing system 120 that may be used to monitor and manage server resources. The term "computing system" refers to the computing resources of a single computer, the partial computing resources of a single computer, a plurality of computers communicating with one another, or a network of remote servers.

Figure 2:
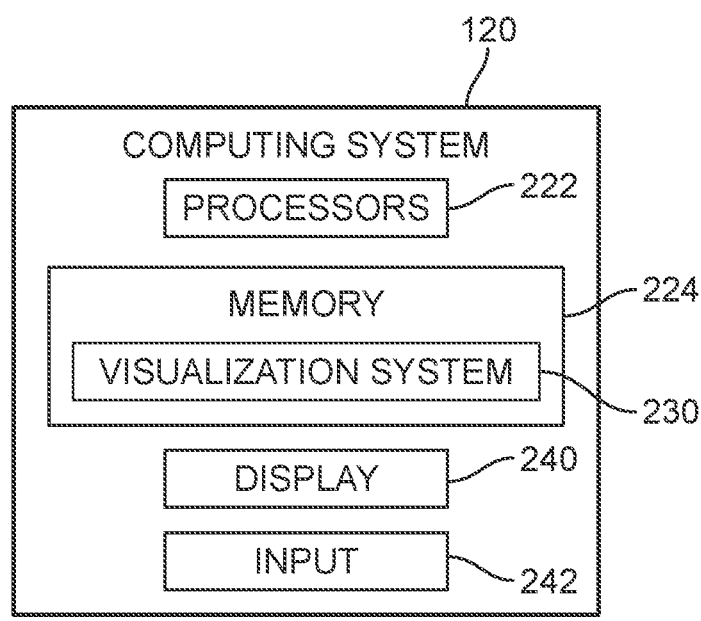
FIG. 2 is a schematic view of some components of the computing system of FIG. 1.

As seen in FIG. 2, computing system 120 may comprise one or more processors 222 and memory 224 for storing information, including software information and/or data. Memory 224 may comprise a non-transitory computer readable medium. Instructions stored on the non-transitory computer readable medium may be executed by the one or more processors 222. Memory 224 may include any type of short-term and/or long-term memory (or storage), including Random Access Memory (RAM), micro-SD memory and Solid State Drives (SSD).

Although not shown, computing system 120 may be in communication with one or more databases. These databases could include any kind of storage devices, including but not limited magnetic, optical, magneto-optical, and/or memory, including volatile memory and non-volatile memory.

Computing system 120 may include a display 240. Display 240 may be used to display a data visualization of server data. Computing system 120 may also include one or more inputs 242. Inputs 242 could comprise a keyboard, mouse, as well as any hardware for receiving audible commands.

The exemplary system can include a visualization system 230 stored within memory 224. Visualization system 230 may comprise any software, processes or services used to generate a visualization of data, such as server data. In some cases, visualization system 230 may be configured to automatically retrieve various kinds of server data corresponding to server clusters 110.

Referring back to FIG. 1, computing system 120 may communicate with one or more server clusters 110 through a network 150. In some embodiments, network 150 may be a wide area network ("WAN"), e.g., the Internet. In other embodiments, network 150 may be a local area network ("LAN"). In yet other embodiments, network 150 may be a combination of a WAN and a LAN.

Computing system 120 may receive one or more requests for resources 160. In some cases, these may come in the form of new project requests. For example, if a vendor working with a company that operates server system 100 wants to deploy a new software application in the private cloud operated by the company, the necessary computational resources needed for the new project can be submitted as a request to any parties responsible for monitoring and managing server resources. In some embodiments, requests 160 could be received over a wide area network such as the Internet 170. In other embodiments, requests 160 could be received through another network, such as network 150.

Requests for resources may comprise details about the computational resources required for enabling a given project. This may include a minimum number of processing cores required, a minimum amount of memory (such as RAM) and a minimum amount of storage (for example, hard drive space). In some cases, requests for resources may further include additional details about additional hardware and/or software requirements.

Figure 3:
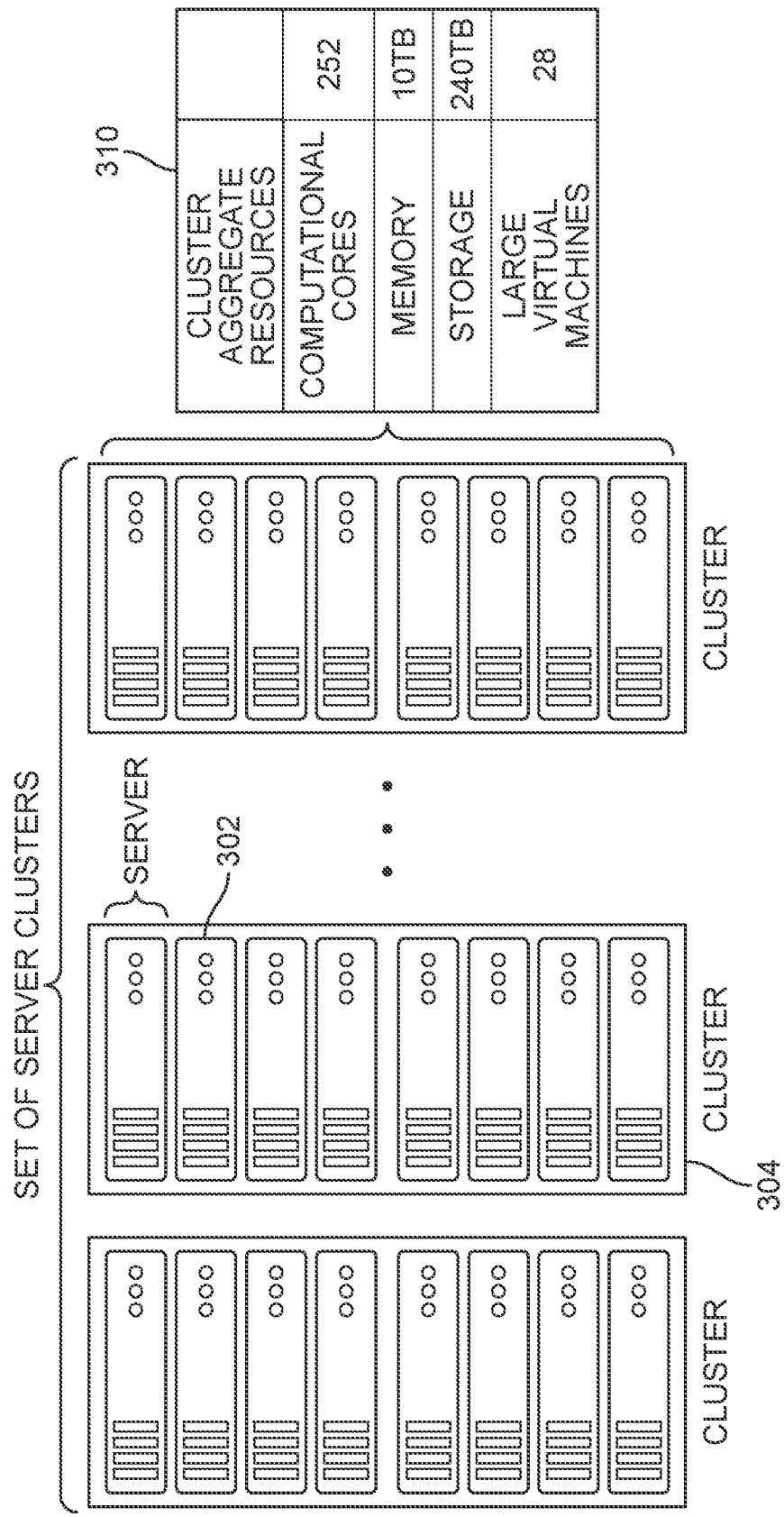
FIG. 3 is a schematic view of a plurality of server clusters, according to an embodiment.

FIG. 3 is a schematic view demonstrating how servers are organized into server clusters and sets of server clusters, according to an embodiment. Referring to FIG. 3, multiple individual servers 302 may be organized into distinct server clusters 304. In the exemplary embodiment, server clusters 304 are depicted as organized into distinct co-located stacks of clusters, often referred to as racks. However, it may be appreciated that the server clusters need not comprise servers in a single rack, and in some cases virtual server clusters could be distributed over servers from two or more different racks.

The server clusters 304 may be organized into a set of server clusters. In some cases, sets of server clusters can be further organized into zones. A zone of server clusters may share common features, such as a common geographic region. Zones may also reflect compute resources that are intentionally segregated from other zones at all layers of the compute stack for the fulfillment of high availability requirements in the event of hardware failure at any layer in the compute stack.

Each server cluster is configured to pool computational resources that can be distributed over one or more virtual servers, or virtual machines that run within the server cluster. For example, in the exemplary embodiment of FIG. 3, each cluster may be configured with an aggregate set of computational resources. As depicted in resource table 310, each cluster could have a fixed number of computational cores (comprised of CPUs, virtual CPUs, or GPUs), a fixed amount of short-term memory (such as RAM), a fixed amount of long-term storage (such as hard drive space), and a maximum number of large virtual machines available to run on the server cluster. As used herein, the term "large virtual machine" or "large core virtual machine" refers to a virtual machine running with at least a minimum number of processing cores. The minimum number may vary from one embodiment to another and may be selected according to factors such as the number of servers in a cluster (or rack) and the number of cores in each server cluster.

In the example resource table 310, each cluster is provided with 252 computational cores (CPUs, or virtual CPUs, for example), 10 TB (or 10,000 GB) of memory, 240 TB of storage, and a maximum number of 28 large virtual machines. Of course, the amount of computational resources available within each cluster may vary from one embodiment to another and may generally depend on the computational resources of each individual server and the number of servers in a cluster. Restrictions on the number of large virtual machines can be set to reduce problems that arise when too many large virtual machines are operated within a single cluster.

In some embodiments, aggregate processing power within a server cluster can be divided into a number of virtual CPUs (or vCPUs). A virtual CPU represents a portion or share of a physical CPU, which may be assigned to a virtual machine running in a server cluster. Thus, it may be appreciated that throughout the embodiments processing capacity could be measured in terms of a number of computational cores, which may themselves be either physical CPUs, virtual CPUs (or possibly GPUs or virtual GPUs).

It may be appreciated that in operation, the resources available for projects deployed on each cluster may be less than the total aggregate cluster resources. For example, some resources may be reserved for maintenance and unavailable for allocation outside of maintenance times. Thus, for example, 4 cores of the 252 cores available in table 310 may be set aside for maintenance, leaving only 248 cores available for allocation.

Computing projects can be deployed onto the server clusters in the form of virtual servers or virtual machines. Each virtual server can be deployed within a single physical server, or across multiple physical servers in the server cluster. A server cluster may generally fit as many virtual servers as are permitted by the aggregate resources of the server cluster, subject to some restrictions. In finding capacity for new computing projects, therefore, an operator must find a server cluster with sufficient capacity to "fit" the new project (or the virtual server/machine corresponding to that project). More specifically, the operator must find a server cluster with the requested amount of processing cores, memory and storage still available.

Figure 4:
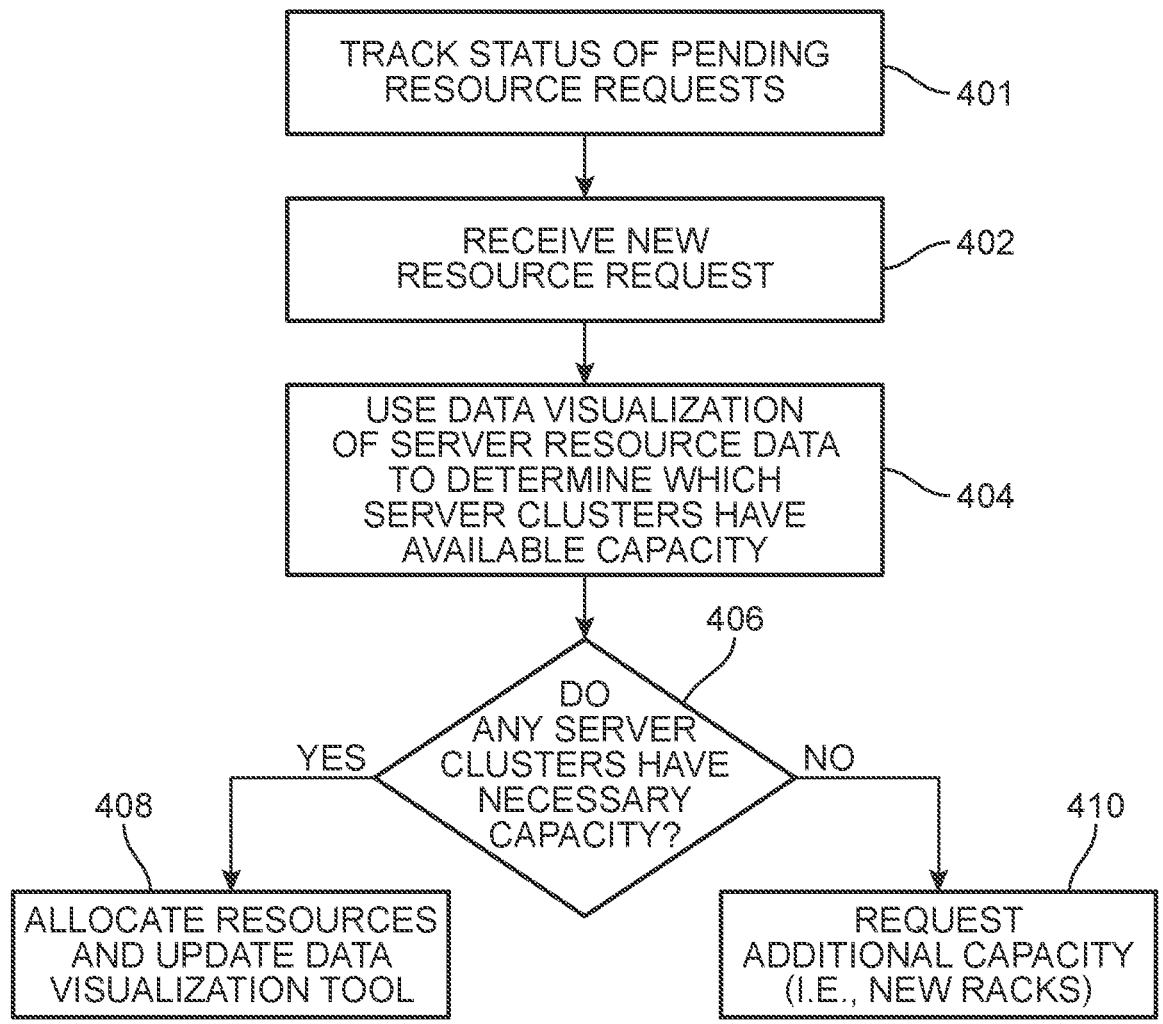
FIG. 4 is a schematic view of a process for managing server resources, according to an embodiment.

FIG. 4 is a schematic view of a process for using a visualization tool to manage server resource allocation. In some embodiments, the steps shown in FIG. 4 could be performed by a human user. In other embodiments, one or more steps could be automated.

In step 401, the user (or an automated system) may track the status of pending resource requests. As these requests progress through a corresponding workflow process for allocating resources, the user may track and update the status of each request. This ensures that these pending requests for resources are correctly accounted for in the visualization tool.

In step 402, the user may receive a new resource request. The resource request may be received by a party interested in having a virtual machine deployed on one or more server clusters within a server system (such as server system 100).

In step 404, the user may use a data visualization of the server resource data to determine which clusters have available capacity. Specifically, the user may use a visualization tool provided as part of a visualization system (for example, visualization system 230 of FIG. 2). At a glance, the user may be able to readily see which server clusters, if any, may have the required computing capacity.

If the user determines that there is capacity to support the resource request in step 406, the user may proceed to step 408. In step 408, the user may perform any procedures necessary to allocate the necessary resources within one or more server clusters. During step 408, the user may also update the visualization system data so that the visualization tool displays updated information for the server clusters.

If the user determines that there is not capacity to support the resource request in step 406, the user may proceed to step 410. In step 410, the user may request additional computational resources in the form of new server racks or clusters.

Figure 5:
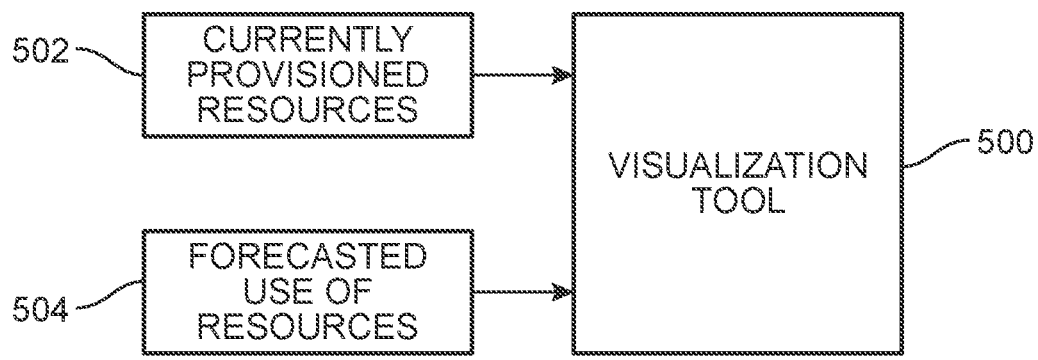
FIG. 5 is a schematic view of inputs to a visualization tool, according to an embodiment.

FIG. 5 is a schematic view of a visualization tool and possible inputs to the tool. Referring to FIG. 5, visualization tool 500 may receive both currently provisioned resource data 502 and forecasted use of resource data 504. Currently provisioned resource data 502 comprises the computational resources that are presently allocated, or otherwise unavailable, for each server cluster in the server system. Forecasted use of resource data 504 comprises the computational resources that are reserved for projects in various planning stages. These are projects that have yet to be deployed onto the servers, but are pending. By using both currently provisioned resources and forecasted resources, the visualization system may help a user obtain a snapshot of the resources that have already been claimed by various parties. This may help reduce the tendency of resource managers to overpromise, or double-book, computational resources which may result in significant project delays and customer dissatisfaction.

Figure 6:
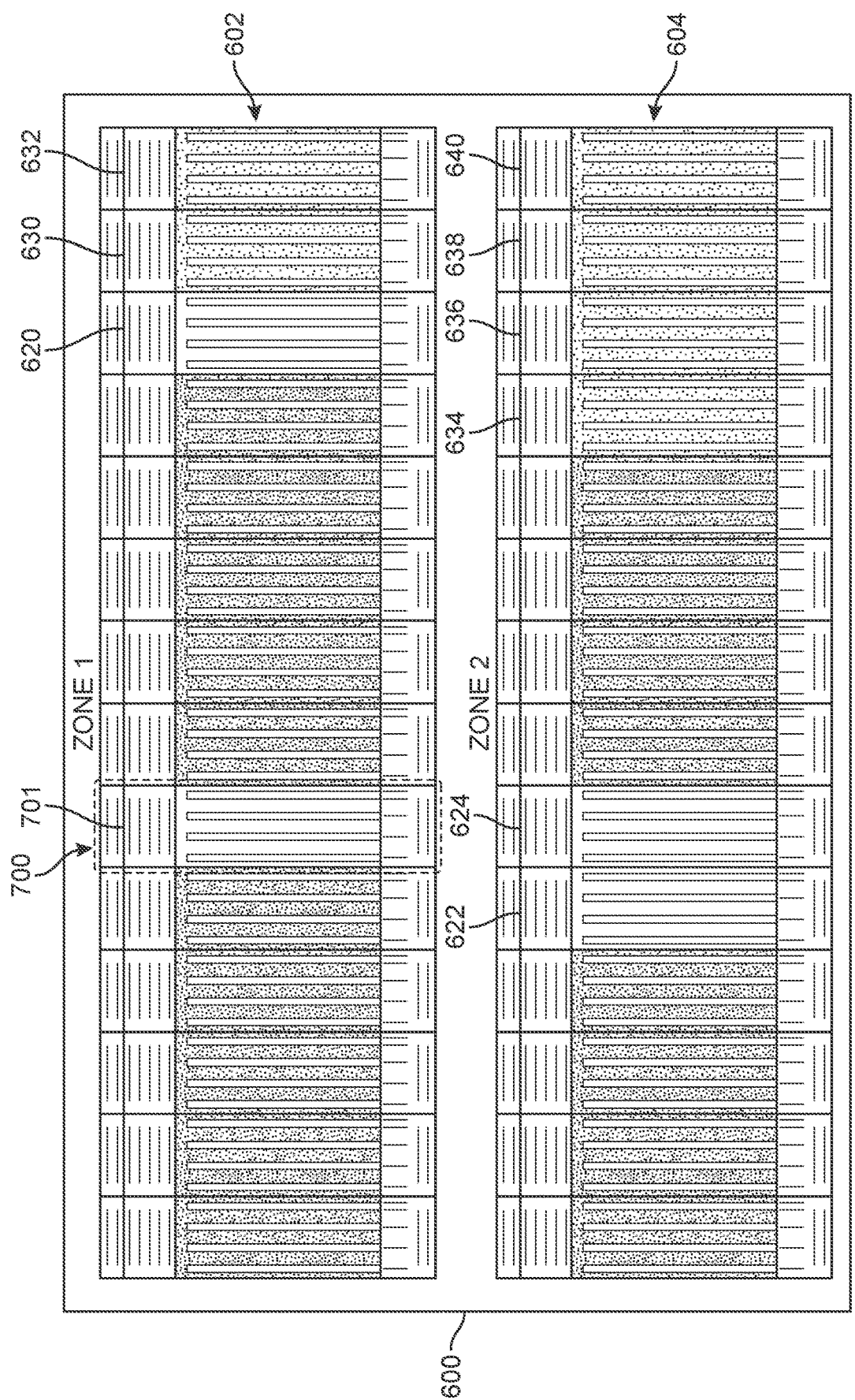
FIG. 6 is a schematic view of a data visualization of computational capacity across a plurality of server clusters, according to an embodiment.

FIG. 6 is a schematic view of a visualization tool 600. Visualization tool 600 could be provided as part of a software application running on a computing device. Visualization tool 600 could also be provided as an element of a webpage running in a browser.

Referring to FIG. 6, visualization tool 600 provides a graphical display of the allotment of resources within each server cluster. The exemplary view depicts server data corresponding to a first set of server clusters 602 organized into a first row and a second set of server clusters 604 organized into a second row. Each set of server clusters may be collectively referred to as a zone of server clusters (for example, "Zone 1" and "Zone 2"). In some cases, each zone is associated with a particular geographic location, such as a particular city. In other cases, zones may not correspond to distinct geographic regions. In some cases, each zone may represent distinct compute stacks within a datacenter kept separate for availability support purposes.

Figure 7:
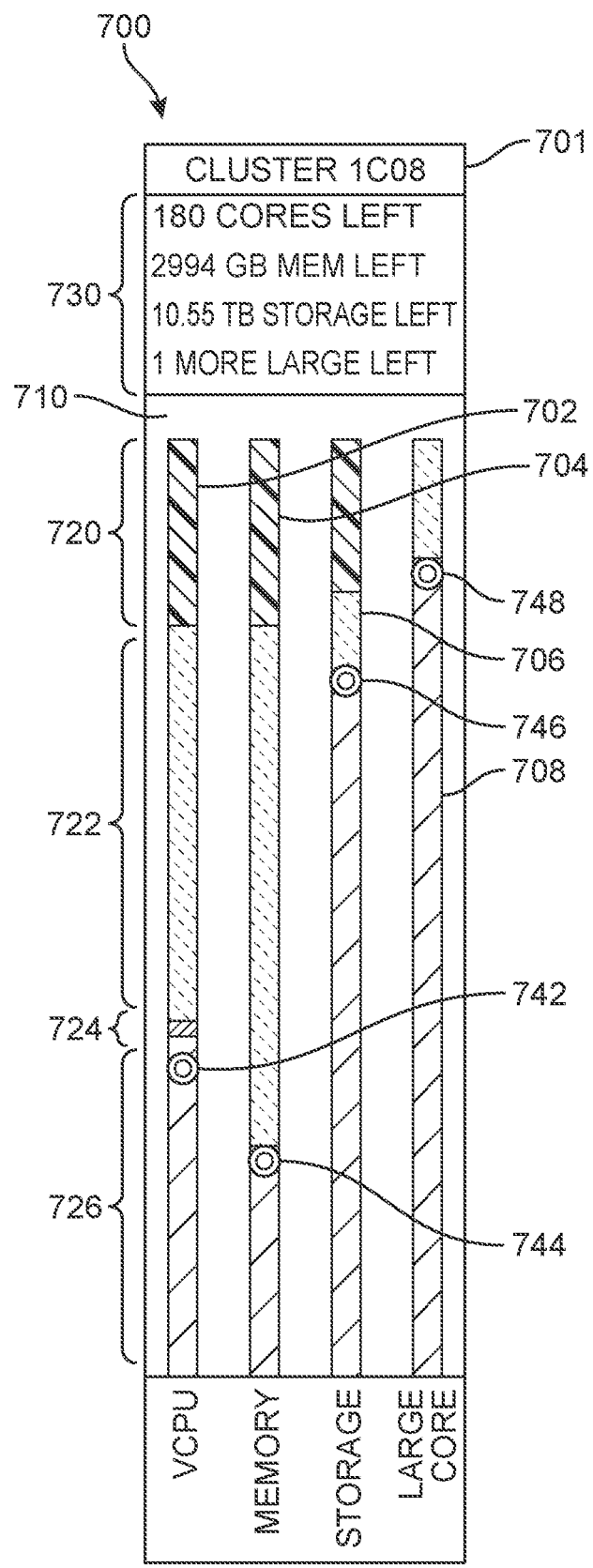
FIG. 7 is a schematic view of a data visualization of computational capacity for a single server cluster, according to an embodiment.

FIG. 7 is a schematic view of an exemplary element of the visualization displayed in FIG. 6. Specifically, FIG. 7 depicts a visualization of server data for a single server cluster 701 ("Cluster 1C08"). Referring to FIG. 7, cluster capacity visualization 700 comprises four data sets (or data series) displayed against a background 710. The four data sets include a first data set 702, a second data set 704, a third data set 706 and a fourth data set 708 and correspond to the number of cores, the amount of memory, the amount of storage and the number of large core virtual machines, respectively.

Figure 9:
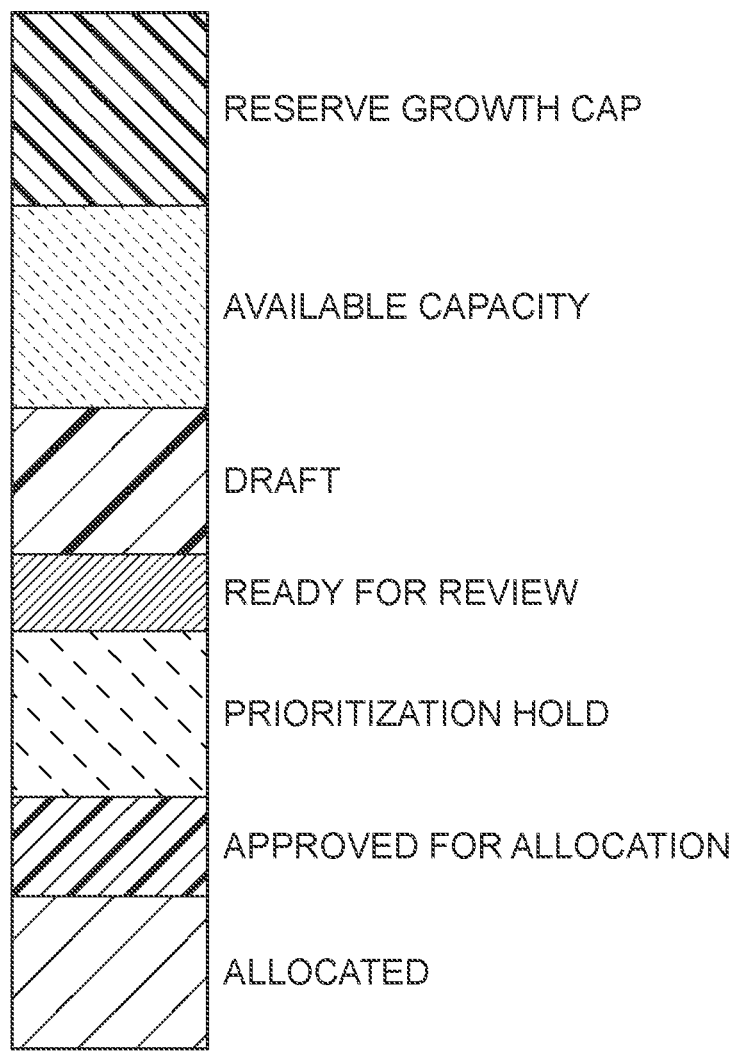
FIG. 9 is a schematic view showing different resource categories, according to an embodiment.

In the exemplary embodiment, these four data sets are plotted as stacked bars in a stacked bar graph. Each bar indicates the percentages of each computational resource that is allotted to various resource categories. For example, first data set 702 depicts the percentage of vCPU cores allotted to reserve growth (bar segment 720), the percentage of vCPU cores currently available (bar segment 722), the percentage of vCPU cores allotted to requests currently under review (bar segment 724), and the percentage of vCPU cores currently allocated to deployed projects (bar segment 724). For reference, FIG. 9 provides a reference for determining resource category associated with a given visual pattern/shading in each bar segment.

In the exemplary embodiments, the stacked bars depict the percentages of resource allotment, with the total allotment equaling 100%. This provides a clear visual indication of the relative amount of resources allotted to each category. Moreover, because the stacked bars are all normalized to 100%, it is relatively easy to see which computational resources have the most resources available (or allocated). In other embodiments, however, stacked bars could indicate absolute values of resource allotment (for example, indicating vCPU allotment in terms of the number of vCPU cores in each resource category).

While the exemplary embodiments use stacked bar graphs (or charts) to visualize data sets, other embodiments could use other kinds of graphs/charts. These include, but are not limited to: pie charts, radial bar charts or any other suitable kinds of charts.

Cluster capacity visualization 700 also includes a header 730 summarizing the absolute quantity of available computing resources. This includes the number of available cores, the total available memory, the total available storage, and the total number of large virtual machines still available. Thus, after a user has visually inspected the cluster capacity visualizations to quickly find clusters with the greatest amount of available resources, the user can review the summary information in header 730 to determine the quantity of available resources in absolute terms.

Allocated resources may be designated for use in a particular computing project. If one or more entities using the server cluster have requested more resources than are actually needed, the utilization of the resources may be substantially less than the amount of resources allocated.

To quickly determine server clusters where resources are over or under allocated, cluster capacity visualization 700 may also include provisions to graphically depict the current utilization of each computational resource. As used herein, "utilized" refers to resources that are actively being used, as opposed to simply allocated.

First utilization data point 742 is plotted over first data set 702 to show the percent of vCPU cores being currently utilized. Second utilization data point 744 is plotted over second data set 704 to show the percent of memory currently being utilized. Third utilization data point 746 is plotted over third data set 706 to show the percent of storage currently being utilized. Fourth utilization data point 748 is plotted over fourth data set 708 to show the percentage of large virtual machines currently being utilized.

By comparing utilization and allocation, a user can see if there is a need to allocate more resources or scale back allocated resources for a given project or virtual machine. For example, if a project is over allocated, the user could suggest that the resources be scaled back to free up underutilized resources for other projects. Likewise, if a project is under allocated, the user could suggest provisioning more permanently allocated resources in the server cluster.

Allocating resources on server clusters is made difficult by the fact that any new project (or corresponding virtual machine) will need a minimum amount of each of the following three computational resources: cores, memory, and storage to provision a new virtual server/machine on the server cluster. Thus, even if a server cluster has only capped (that is, maxed out) with respect to one of the three computational resources, it is not possible to provision further projects/virtual machines on the server cluster.

To help a user quickly distinguish between server clusters where there is some capacity available across all three of these computational resources, and server clusters that are capped with respect to one or more computational resources, the visualization tool may incorporate a cluster availability indicator. A cluster availability indicator may comprise any visual element that helps distinguish between server clusters that have capacity across processing cores, memory and storage, and those that are maxed out on at least one of processing cores, memory, and storage. In some embodiments, a cluster availability indicator comprises a region that may be visually changed between the two types of server clusters. In some embodiments, the background color of a cluster capacity visualization may change colors according to the availability of one or more resources, thereby serving as a cluster availability indicator.

Figure 8:
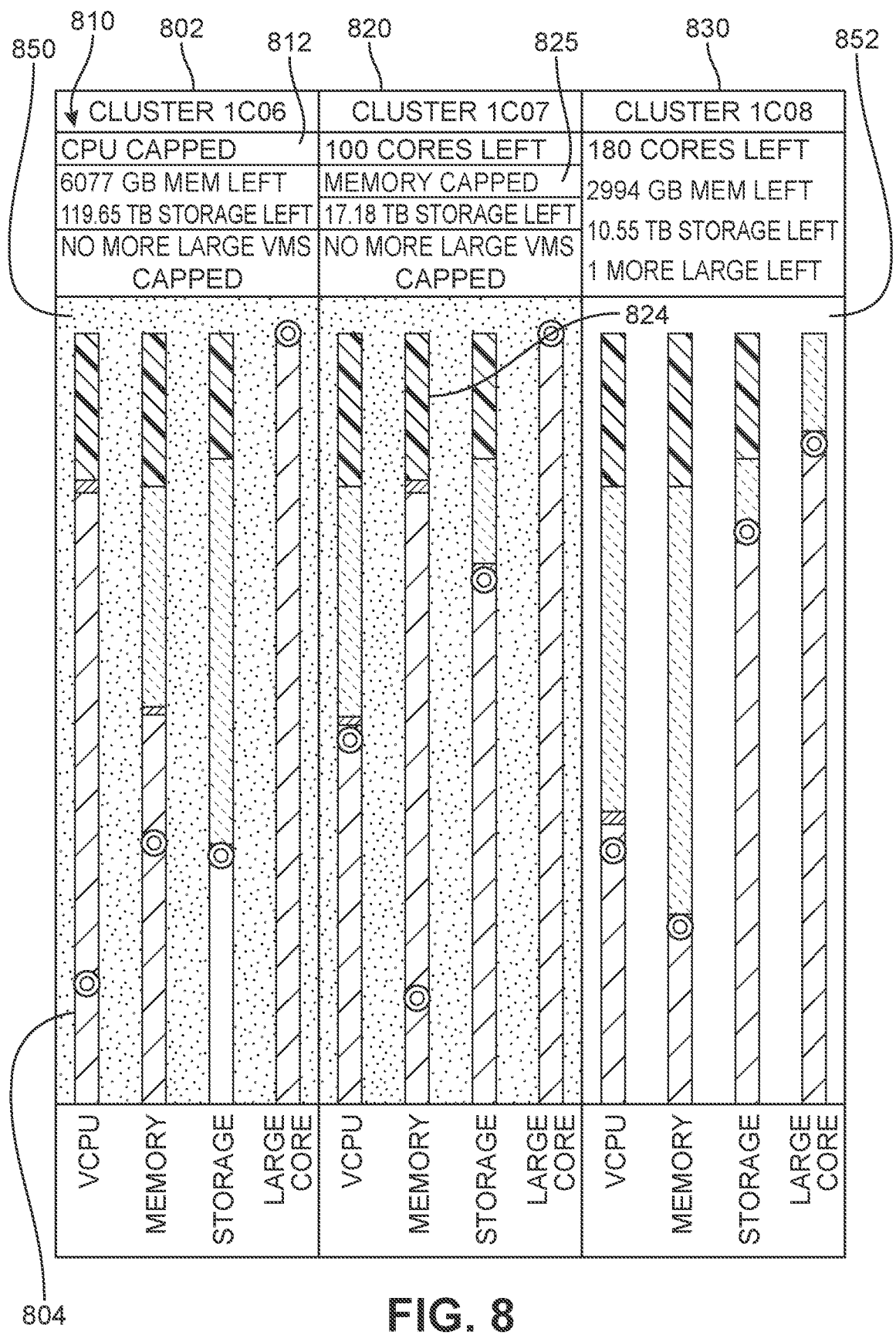
FIG. 8 is a schematic view of a data visualization of computational capacity for three server clusters, according to an embodiment.

FIG. 8 is a schematic view of a visualization of resources for three server clusters. Referring to FIG. 8, first server cluster 802 has no available CPU cores. This is depicted graphically within first bar 804, which does not have any visible segments corresponding to the "Available Capacity" category (see FIG. 9). Furthermore, the summary information in header 810 also includes a "CPU Capped" notification 812. Because first server cluster 802 lacks any available vCPU capacity, there is no room to provision new virtual machines as new requests are received. This is because any new virtual machine would require at least some vCPU cores.

Similarly, second server cluster 820 has no available memory. This is depicted graphically with second bar 824, which does not have any visible segments corresponding to the "Available Capacity" category (see FIG. 9). Furthermore, the summary information for second server cluster 820 also includes a "Memory Capped" notification 825. Because second server cluster 820 lacks any available memory capacity, there is no room to provision new virtual machines as new requests are received.

By contrast, for example, third server cluster 830 has some capacity for vCPU cores, memory and storage, and is therefore available for provisioning additional virtual machines.

To highlight this distinction between server clusters available for new allocations and server clusters that are effectively unavailable, visualization tool 600 may use different colors for each server cluster. Specifically, the data for first server cluster 802 and second server cluster 820 are displayed against a first background color 850. The data for third server cluster 830 are displayed against a second background color 852, which is different than first background color 850. In some embodiments, first background color 850 could be red while second background color 852 could be black. This distinction in colors allows a user to quickly spot server clusters that may be readily available for deploying new virtual machines to support new resource requests.

Using this feature, a user can quickly spot clusters with no capped resources among a broader set. This is clearly shown in FIG. 6, where the lighter background colors of the data visualizations for server cluster 701, server cluster 620, server cluster 622, and server cluster 624 allow a user to quickly spot them among the remaining server clusters. These remaining server clusters include server clusters that are unavailable due to at least one capped resource and are thus visualized with a darker background shading. The remaining server clusters may also include server clusters that have been planned but not yet build. In FIG. 6, this includes server cluster 630, server cluster 632, server cluster 634, server cluster 636, server cluster 638 and server cluster 640, which are all indicated with a lighter shading.

In some embodiments, server clusters may not be available for further allocation when one of processing cores, memory or storage are capped. However, server clusters may be available for further allocation if only the number of large virtual machines is capped, since it is still possible to build smaller virtual machines on the server cluster. Thus, the visualization tool may not change the background color for server clusters where only the number of large virtual machine has been capped (that is, maxed out).

FIG. 9 depicts a schematic view of different possible categories (or statuses) for allotted computational resources. Each category may be depicted graphically using a different color and/or fill pattern so that a user can easily see how resources are being allocated within each server cluster. The exemplary categories depicted in FIG. 9 include "Currently Allocated", "Approved for Allocation", "Prioritization Hold", "Ready for Review", "Draft", "Available", and "Reserve Growth Capacity." Currently Allocated refers to resources that have been designated and are available for use. The Approved for Allocation, Prioritization Hold, Ready for Review and Draft categories all correspond to resources designated for future use. They may collectively comprise a pending resources category. These may be considered promised resources, though some of these resources could be withdrawn during the provisioning process. Available Capacity refers to resources that are neither currently allocated, or designated for future allocation. These are resources that are available for incoming resource requests. Reserved Growth Capacity refers to resources designated for future growth of existing projects/virtual machines running on the cluster. This allows current systems to expand by some amount before having to be reallocated to one or more other server clusters.

In some embodiments, a visualization system may comprise not only a visualization tool for displaying server data, but also various systems and processes for managing and organizing the data displayed with the visualization tool.

Figure 10:
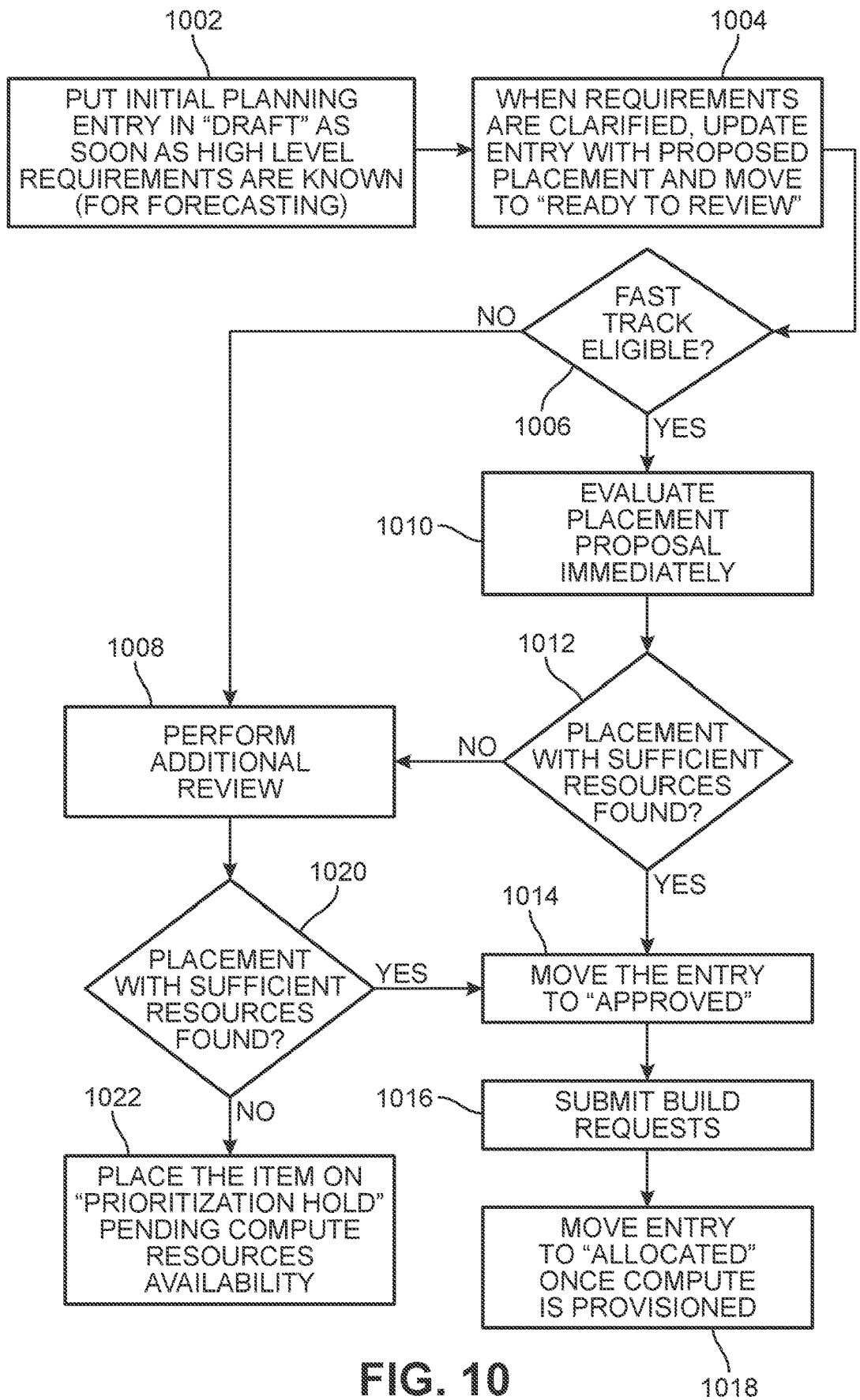
FIG. 10 is a schematic view of a process for determining how to classify new resource requests according to some of the resource categories of FIG. 9.

FIG. 10 depicts a schematic view of an exemplary workflow for assigning different project requests to the different resource categories discussed above and shown in FIG. 9. In some embodiments, the following steps could be performed manually by a user. In other embodiments, one or more of the following steps could be automated.

Referring to FIG. 10, once the high level requirements for a new resource request are known the entry may be designated with the "Draft" resource status in step 1002. Next, in step 1004, once the requirements have been clarified the entry may be updated to have the designation "Ready to Review".

In step 1006, the user may determine if the requested project is fast track eligible. Resource requests may be fast track eligible if they meet particular requirements associated with relatively small computational requirements. For example, in one embodiment, a request may be fast tracked if each server associated with the request requires no more than 8 processing cores, no more than 128 GB of RAM and no more than 1 TB of storage. In other embodiments, of course, any other suitable requirements could be used. Fast tracking projects allows projects to be built quickly without requiring further levels of review.

If the project is not fast track eligible, the user proceeds to step 1008. In step 1008, an additional review of the project is performed. In some cases, this may correspond to submitting the proposal to a board within a company designated to make decisions about server resources.

If, in step 1006, the user determines that the project is fast track eligible, the user proceeds to step 1010 to evaluate the placement proposal immediately. In some cases, this may comprise using the visualization tool to visualize server capacity data and to understand where there are available resources to place the project. In step 1012, the user determines if the proposed placement will work considering the available resources. If not, the user proceeds to step 1008 to perform an additional review, as above. If the proposed placement is sufficient, the user proceeds to step 1014.

In step 1014, the user re-designates the project as being "Approved". Following this, the user submits build requests in step 1016. Once the system has been completely provisioned and deployed on the server cluster, the user may re-designate the entry as "Allocated" in step 1018.

Returning to step 1008, following the additional review the user may determine if there are sufficient resources on one or more server clusters to implement the (possibly updated) placement proposal in step 1020. If so, the user proceeds to step 1014 to have the project moved into the "Approved" phase. Otherwise, the user proceeds to step 1022 to have the project designated with the "Prioritization Hold" category until new resources are made available.

FIG. 11 depicts a schematic view of a report 1100 detailing the amount of available and stranded computational resources across multiple zones of server clusters. The term "stranded resources" refer to capacity for one or more computational resources that cannot be used because at least one of the partner computational resources on the same server cluster are capped (that is, maxed out).

This report can be generated automatically by a visualization system, which already has access to the necessary data to support the visualization tool depicted, for example, in FIG. 6. By providing an overview of both available and stranded resources, decisions can be made to invest in new hardware (such as new server racks), or to reallocate resources among two or more server clusters.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of managing allocation of computational resources in a set of server clusters using a data visualization tool to determine server cluster capacity, the method including the steps of:
   determining utilization of the computational resources in the set of server clusters using a device processor that tracks usage of computational cores, memory, and storage within each server cluster in the set of server clusters;
   receiving a new resource request;
   using the data visualization tool to visualize server cluster capacity, including available capacity for the computational cores, memory, and storage within each server cluster in the set of server clusters;
   based on the visualized server cluster capacity from the data visualization tool, determining if at least one determined server cluster of the server clusters in the set of server clusters has available capacity to support the new resource request;
   fast tracking the new resource request in response to the new resource request being fast track eligible when the new resource request requires less than threshold amounts of computational cores, memory, and storage; and
   allocating computational resources corresponding to the new resource request from the at least one determined server cluster when the at least one determined server cluster has the available capacity to support the new resource request;
   wherein for each server cluster in the set of server clusters, the computational resources of the server cluster are allotted into different categories, the different categories including a reserve growth cap category corresponding to reserved resources designated for future growth of existing projects to allow the existing projects to expand before causing resources to be reallocated from other server clusters.

2. The method according to claim 1, wherein the method further includes requesting additional server clusters when there is no available capacity to support the new resource request within the set of server clusters.

3. The method according to claim 2, wherein the method further includes placing the new resource request on a prioritization hold while awaiting the requested additional server clusters when there is no available capacity to support the new resource request within the set of server clusters.

4. The method according to claim 1, wherein the fast tracking comprises evaluating the new resource request immediately without further review.

5. The method according to claim 1, wherein for each server cluster in the set of server clusters the data visualization tool is configured to display:
   a CPU data set indicating a number of currently allocated computational cores and a number of available computational cores,
   a memory data set indicating an amount of allocated memory and an amount of available memory, and
   a storage data set indicating an amount of allocated storage and an amount of available storage.

6. The method according to claim 5, wherein:
   the CPU data set further indicates a number of computational cores allotted for pending resource requests,
   the memory data set further indicates an amount of memory allotted for pending resource requests, and
   the storage data set further indicates an amount of storage allotted for pending resource requests.

7. The method according to claim 1, wherein the data visualization tool is configured to display currently allocated resources and amounts of resources allotted for pending resource requests by indicating an allotment of the computer resources of the computational resources into the different categories for a corresponding server cluster.

8. The method according to claim 7, wherein the data visualization tool is configured to display the allotment of the computation resources into the different categories for the computational cores, memory, and storage using stacked bars, wherein each stacked bar includes multiple bar segments indicating the allotment.

9. A method of managing allocation of computational resources in a set of server clusters using a data visualization tool to determine server cluster capacity, the method including the steps of:
   determining utilization of the computational resources in the set of server clusters using a device processor that tracks usage of computational cores, memory, and storage within each server cluster in the set of server clusters;
   receiving a new resource request;
   using the data visualization tool to visualize server cluster capacity, including available capacity for the computational cores, memory, and storage within each server cluster in the set of server clusters;
   based on the visualized server cluster capacity from the data visualization tool, determining if at least one determined server cluster of the server clusters in the set of server clusters has available capacity to support the new resource request;
   fast tracking the new resource request in response to the new resource request being fast track eligible when the new resource request meets particular computational requirements; and
   allocating computational resources corresponding to the new resource request from the at least one determined server cluster when the at least one determined server cluster has the available capacity to support the new resource request;
   wherein for each server cluster in the set of server clusters, the computational resources of the server cluster are allotted into different categories, the different categories including a reserve growth cap category corresponding to reserved resources designated for future growth of existing projects to allow the existing projects to expand before causing resources to be reallocated from other server clusters.

10. The method according to claim 9, wherein the method further includes requesting additional server clusters when there is no available capacity to support the new resource request within the set of server clusters.

11. The method according to claim 10, wherein the method further includes placing the new resource request on a prioritization hold while awaiting the requested additional server clusters when there is no available capacity to support the new resource request within the set of server clusters.

12. The method according to claim 9, wherein the fast tracking comprises evaluating the new resource request immediately without further review.

13. The method according to claim 9, wherein for each server cluster in the set of server clusters the data visualization tool is configured to display:
   a CPU data set indicating a number of currently allocated computational cores and a number of available computational cores, a memory data set indicating an amount of allocated memory and an amount of available memory, and a storage data set indicating an amount of allocated storage and an amount of available storage.

14. The method according to claim 13, wherein:

the CPU data set further indicates a number of computational cores allotted for pending resource requests, the memory data set further indicates an amount of memory allotted for pending resource requests, and the storage data set further indicates an amount of storage allotted for pending resource requests.

15. The method according to claim 9, wherein the data visualization tool is configured to display currently allocated resources and amounts of resources allotted for pending resource requests by indicating an allotment of the computer resources of the computational resources into the different categories for a corresponding server cluster.

16. The method according to claim 15, wherein the data visualization tool is configured to display the allotment of the computation resources into the different categories for the computational cores, memory, and storage using stacked bars, wherein each stacked bar includes multiple bar segments indicating the allotment.

17. A method of managing allocation of computational resources in a set of server clusters using a data visualization tool to determine server cluster capacity, the method including the steps of:

determining utilization of the computational resources in the set of server clusters using a device processor that tracks usage of computational cores, memory, and storage within each server cluster in the set of server clusters;

receiving a new resource request;

using the data visualization tool to visualize server cluster capacity, including available capacity for the computational cores, memory, and storage within each server cluster in the set of server clusters;

based on the visualized server cluster capacity from the data visualization tool, determining if at least one determined server cluster of the server clusters in the set of server clusters has available capacity to support the new resource request;

fast tracking the new resource request in response to the new resource request being fast track eligible;

wherein the fast tracking comprises evaluating the new resource request immediately without further review; and allocating computational resources corresponding to the new resource request from the at least one determined server cluster when the at least one determined server cluster has the available capacity to support the new resource request;

wherein for each server cluster in the set of server clusters, the computational resources of the server cluster are allotted into different categories, the different categories including a reserve growth cap category corresponding to reserved resources designated for future growth of existing projects to allow the existing projects to expand before causing resources to be reallocated from other server clusters.

18. The method according to claim 17, wherein the method further includes detecting stranded resource information and allocating computational resources based on the stranded resource information.

19. The method according to claim 17, wherein the allocating computational resources includes allocating a small virtual machine when all large virtual machines have been allocated but computational cores, memory, and storage are available.

20. The method according to claim 17, wherein the new resource request is fast track eligible when it meets particular requirements associated with relatively small computational requirements.

* * * * *